United States Patent
Polumbus et al.

(10) Patent No.: US 9,245,017 B2
(45) Date of Patent: Jan. 26, 2016

(54) METATAGGING OF CAPTIONS

(75) Inventors: Richard T. Polumbus, Englewood, CO (US); Troy A. Greenwood, Centennial, CO (US)

(73) Assignee: CAPTION COLORADO L.L.C., Greenwood Village, CO (US)

( * ) Notice: Subject to any disclaimer, the term of this patent is extended or adjusted under 35 U.S.C. 154(b) by 1355 days.

(21) Appl. No.: 12/429,808

(22) Filed: Apr. 24, 2009

(65) Prior Publication Data

US 2010/0257212 A1 Oct. 7, 2010

Related U.S. Application Data

(60) Provisional application No. 61/166,963, filed on Apr. 6, 2009.

(51) Int. Cl.
*G06F 17/30* (2006.01)
*G11B 27/031* (2006.01)

(52) U.S. Cl.
CPC .... *G06F 17/30746* (2013.01); *G06F 17/30752* (2013.01); *G06F 17/30796* (2013.01); *G11B 27/031* (2013.01)

(58) Field of Classification Search
CPC .... G10L 15/26; G10L 21/06; H04N 21/8405; H04N 21/4722; H04N 21/4884; H04N 5/445; H04N 5/44508; H04N 7/0885; G06F 17/30796; G06F 17/28; G06F 17/30684; G06F 17/30746; G06F 17/30752; G06F 17/30864
USPC .......... 348/461–463, 468; 725/136–137, 109, 725/110, 112
See application file for complete search history.

(56) References Cited

U.S. PATENT DOCUMENTS

| | | | |
|---|---|---|---|
| 5,508,754 A | 4/1996 | Orphan | |
| 5,805,153 A | 9/1998 | Nielsen | |
| 5,835,667 A * | 11/1998 | Wactlar et al. | 386/241 |
| 6,473,778 B1 * | 10/2002 | Gibbon | 715/201 |
| 6,637,032 B1 * | 10/2003 | Feinleib | 725/110 |
| 7,047,191 B2 * | 5/2006 | Lange et al. | 348/468 |
| 7,050,109 B2 | 5/2006 | Safadi et al. | |
| 7,861,275 B1 * | 12/2010 | Vellaikal et al. | 725/109 |
| 2002/0075403 A1 | 6/2002 | Barone et al. | |
| 2002/0196370 A1 | 12/2002 | Dagtas et al. | |
| 2003/0169366 A1 | 9/2003 | Lenzi et al. | |
| 2007/0118374 A1 * | 5/2007 | Wise et al. | 704/235 |
| 2008/0177786 A1 * | 7/2008 | Faisman et al. | 707/104.1 |
| 2008/0252780 A1 | 10/2008 | Polumbus et al. | |
| 2009/0299748 A1 * | 12/2009 | Basson et al. | 704/270 |

OTHER PUBLICATIONS

Microsoft Corporation, "Understanding SAMI 1.0", Originally published Oct. 2001, Updated Feb. 2003.*

(Continued)

*Primary Examiner* — Hai V Tran
(74) *Attorney, Agent, or Firm* — Dorsey & Whitney LLP

(57) ABSTRACT

A method for the real-time metatagging and captioning of an event. The method for the real-time metatagging and captioning of an event may include embedding metatag information in a caption file provided by a captioner. The embedded metatag information may allow a user to access additional information via the text of the captioned event. The metatag information may be embedded using a captioning device that creates both the text code and embeds the metatag code.

28 Claims, 3 Drawing Sheets

(56) References Cited

OTHER PUBLICATIONS

Cheetah International, "TurboCAT", http://www.caption.com/English/Products/TubroCT/TurboCAT.html., printed Dec. 19, 2001, pp. 1-13.

FCC Title 47 CFR 15.119, Chapter I—Federal Communications Commission, "Closed Caption Decoder Requirements", pp. 1-16, revised Oct. 1, 2000.

* cited by examiner

METATAGGING OF CAPTIONS

CROSS-REFERENCE TO RELATED APPLICATIONS

The present application claims the benefit under 35 U.S.C. §119(e) to U.S. provisional patent application No. 61/166,963 filed on Apr. 6, 2009 and entitled "Metatagging of Captions", and is incorporated by reference into the present application in its entirety.

This application also cross references U.S. nonprovisional application Ser. No. 10/094,689, entitled "METHOD AND APPARATUS FOR CONTROL OF CLOSED CAPTIONING" and filed on Mar. 8, 2002, which is incorporated herein as if set forth in its entirety.

BACKGROUND

1. Technical Field

The present invention relates generally to metatagging, and more particularly to real-time metatagging of an audio steam, a video stream and/or a captioned event.

2. Background Discussion

Many events, television programs, movies, live performances, courtroom activities, and so on, are transcribed, captioned or have associated text corresponding to the event. These captions and/or text may be produced and/or added to the event as it is ongoing or during a replay of the event. The caption and/or text may also be used later, either separately, played back, as a transcript or concurrently with associated video, to review the event. Captions and/or text are often useful, for example, when hearing-impaired individuals watch or participate in the event by an individual watching the event at a low or zero volume, or to clarify audio of the event. "Captions," as used herein, generally refer to a transcription or summation of an event or audio associated with the event, such as the words spoken during the event. In one example, "text" may be a caption.

Captions may be shown on various displays such as televisions, computing device (including handheld and portable computing devices), personal digital assistants ("PDAs"), mobile devices and so on. Although a user may have access to captions and/or text associated with video streams, as well as audio streams relating to or containing audio associated with an event, the user may desire additional information regarding the event or to review the text of specific portions of the event as the event continues to take place. The user may view the captioning text on the aforementioned displays, but may desire access to additional information regarding the event. Generally, the additional information may take a variety of forms, including personal information for individuals in the event, statistics associated with the event, participants therein, entities associated therewith, prior similar events, and so on. However, the user may not have real-time access to information associated with the event. Users may look up such information via the Internet, but this generally requires the user split his focus or concentration by either using a separate device for such research or momentarily ignoring the event to otherwise access the information through another function of the same device (for example, opening a second application on a computer).

Thus, a method of real-time metatagging of at least audio streams, video streams and/or events is desirable. Accordingly, there is a need in the art for an improved method for the real-time metatagging of audio streams, video streams and/or captioned events.

SUMMARY OF THE INVENTION

One embodiment of the present invention may take the form of a method for metatagging an event. A first device may receive at least a first set of audio and/or video data of the event while the event is occurring. The first device may generate a text file including both text and metatag codes, from the first set of audio and/or video data, by employing keystrokes on the first device that produce both text and metatag codes. A second device may receive the text file and may format the text file to generate a caption file. The second device may generate a stripped caption file by stripping the metatag code from the caption file and may also transmit the stripped caption file as a live text stream.

Another embodiment of the present invention may take the form of a method for creating a metatagged file. A captioning device may receive a text file and may generate a caption file at the captioning device by employing keystrokes on the captioning device to embed metatags in the caption file. Automated search capability may also be used to identify information for metatagging and to automatically embed meta tags without employing keystrokes. The captioning device may transmit the caption file as a live text stream with embedded metatags. Additionally, the captioning device may transmit the caption file and video data to an archive system which may index the caption file to the video data by time stamping the caption file.

Yet another embodiment of the present invention may take the form of a system for creating a metatagged caption file. The system may include a caption device and a captioning system. The caption device may be configured to receive at least a first set of audio and/or video data of an event at the caption device while the event is occurring and may be further configured to produce text and metatag codes using the same keystroke and/or automated search and to generate a text file. The captioning system may be configured to receive the text file and to generate a caption file by formatting the text file. The system may also include an editing system and an archive system. The editing system may be configured to edit the caption file, strip the metatag codes from the caption file, add metatag codes to the caption file and index the caption file to at least one of video data or audio data. The archive system may be configured to receive the caption file, receive at least one of video data or audio data and index the caption file to at least one of the video data or audio data.

DETAILED DESCRIPTION OF THE INVENTION

Introduction

Figure 1:
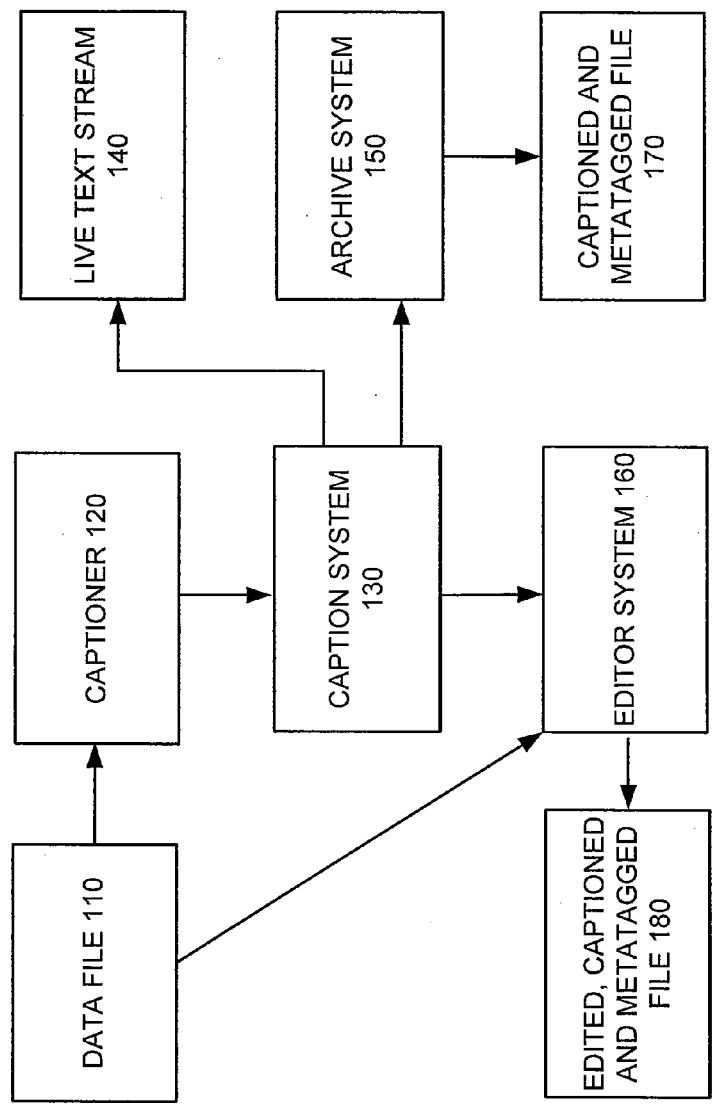
FIG. 1 depicts an embodiment of a captioning and metatagging system.

One embodiment takes the form of a method for providing information associated with an event in real-time (e.g., as the event takes place, or with a minimal delay, such as less than a minute) to a user. Generally, the information may include, but is not limited to, captions corresponding to the audio portion of the event, text that corresponds to the audio portion of the event, statistical information regarding the event, statistical information regarding the individuals participating in the event, video portions of the event, phrases, places and/or people associated with the event, specific occurrences in the event itself or any combination thereof. Additionally, captioning may describe audio content including verbal and non-verbal content may be a transcription corresponding to the audio portion of an event and may be formatted for display on a monitor such as a television screen or any type of device with a screen. Captioning may include changing the color, graphics or display of the captions to provide additional information and/or context of the caption, like whom is speaking, location of an event, location of a speaker and so on. In this embodiment, an event may be real-time captioned and metatagged and provided to a device. A user may view the text of the caption on the device (or an associated display) and may desire access to additional information associated with the event, as the event is taking place. As the user is viewing the text, the user may select a metatagged word, phrase, person or so on from the text, which may appear in a fashion similar to a hyper text markup language ("HTML") link. The user may access, via the metatagged caption text, the desired information. The user may access, for example, information regarding the event itself, phrases, places and/or people associated with the event, specific occurrences in the event itself or any combination thereof.

As one example, the event may be a sporting match and the user may select a metatagged caption to access statistical information regarding the performance of a player. Sample statistical information may include percentage of completed passes for a football game, runs batted in for a baseball game, average speed of a marathon runner, first serve percentage for a tennis player and so on. In another example, the user may additionally use the metatagged captions to access specific events in the football game such as touchdowns, beginning of quarters, half-time, interceptions and so on. It should be appreciated that the event may be a news broadcast, audiovisual program, live performance, telephone conference, or any other suitable event that is captioned in real-time or after the fact. The metatags and information accessed through the metatags may vary according to the nature of the event, its participants, its place and other factors.

In yet another example of an embodiment, a captioning system may provide a user with caption data or text that may be a real-time transcription of an event. As previously discussed, the user may view the text of the event as it takes place and may select the desired metatagged text which may appear as a link in the text. Such viewing may occur, for example on a handheld device such as any portable computing device, mobile phone, personal digital assistant ("PDA"), audio/visual media player and so on. The metatagged information may correspond to a word, person, phrase, subject matter, concept, related terms, references to other sources of similar terms, place, specific happening in the captioned event, time block in the captioned event and so on. For example, a time block may be the second quarter of a football game and a specific happening in the captioned event may be a touchdown in the second quarter. In one example, the user may be viewing text of a captioned Denver Broncos football game and may wish to view all the touchdowns the Denver Broncos have scored. To do so, the user may access the corresponding information via the metatagged text (for example, "touchdowns") in the captioned text and/or video/audio segment.

Another embodiment may take the form of a method for the real-time captioning and metatagging of an event. In this embodiment, data, such as an audio file, may be provided to a captioner who transcribes the event as it takes place and who creates a caption file. The captioner may create the caption file using a captioning device for transcribing the text and for embedding the metatag code in the text code of the caption file. Generally, any word, such as a phrase, place and/or name may be metatagged. Specific keystrokes or other entry methods on the captioning device may produce the text code for specific words, (which translates to text on a display) and may also embed the metatag codes corresponding to the specific words into the text code. For example, the keystroke to produce the text "John Elway" may also embed the metatag for "John Elway" in the text code. Additionally, a keystroke may be a specific metatag keystroke including the relevant metatagging information for the corresponding word and/or phrase. The keystrokes may be defined by the captioner in a dictionary created by the captioner, or the captioning device may include keystrokes with pre-defined metatags for specific words, people, phrases, subject matter, concepts, related terms, references to other sources of similar terms, places, specific happenings in the captioned event, time block in the captioned event and so on, or the captioning and/or metatagging keystroke may reference a database that may include the aforementioned pre-defined metatags and/or captions. Certain embodiments may employ more than one of the foregoing ways for defining keystrokes. Metatagging may be performed in various ways such as using a live captioner as described above, by a later captioner/editor and/or by a live editor. The different metatagging methods will be discussed in further detail below.

Continuing the description of the embodiment, the caption file may be provided to a caption system, such as the Bison Interactive Captioning Console ("BICC"). BICC may, among other functions, format the caption file, so that the caption file may be compatible with end users such as programming providers. BICC may also prepare a formatted first caption file for transmission as a live text stream by stripping out the metatag information. Additionally, BICC may transmit a second formatted caption file to an archive system for further formatting, including time-coding and metatagging. BICC will be discussed in more detail below and also discussed in nonprovisional application Ser. No. 10/094,689, titled "METHOD AND APPARATUS FOR CONTROL OF CLOSED CAPTIONING" and filed on Mar. 8, 2002, which is incorporated herein in its entirety by reference. It should be understood and appreciated that any suitable captioning system may perform any of the functions described herein with reference to BICC. Accordingly, it is to be appreciated that BICC is illustrative in this description; other captioning systems may be employed, optionally with suitable alterations to the system to permit, for example, the insertion of metatags, connection to a network such as the Internet or any other suitable network, and so on.

In an alternative embodiment, the captioning device may not embed the metatag code in the caption file. The caption file may still be transmitted to BICC and then after formatting may be transmitted from BICC to an editing system. The editing system may edit the caption file for grammar and spelling and may additionally, insert time codes and metatags. Words, people, phrases, subject matter, concepts, related terms, references to other sources of similar terms, places, specific happenings in the captioned event, time block in the captioned event and so on, may be identified by the editing system which may insert the corresponding metatags. Additionally, the editing system may insert time codes that may be used for indexing the edited caption file to an audio, video or audiovisual file.

In yet another embodiment, a system may provide a first stream which may be a caption stream and a second stream which may be a metatag stream. In this embodiment, the first caption stream may be provided to a user interested in viewing the text of the captioned event. The second metatag stream may be provided to a user interested in searching for additional information regarding the event and/or participants in the events, instant replays, keyword lookups, alerting and so on. Additionally, the first caption stream may also be metatagged by the system to provide a third metatagged caption stream.

It should be noted that embodiments of the present invention may be used in a variety of captioning systems and video and/or audio systems. The embodiment may include or work with a variety of display components, audio and/or video components, monitors, screens, images, computing devices, portable computing devices and electrical devices. Aspects of the present invention may be used with practically any apparatus related to video and/or audio devices, display systems or any apparatus that may contain any type of display and/or audio system. Accordingly, embodiments of the present invention may be employed in computing systems, portable computing systems and devices used in audio and/or visual events and peripherals and so on.

Before explaining the disclosed embodiments in detail, it should be understood that the invention is not limited in its application to the details of the particular arrangements shown, because the invention is capable of other embodiments. Also, the terminology used herein is for the purpose of description and not of limitation.

Operating Environment

FIG. 1 depicts an embodiment of a captioning configuration 100 that may be used for real-time captioning and metatagging of an event. Generally, the captioning configuration 100 may operate across a network which may include the Internet, Ethernet, local-area networks, wide-area networks, wired networks, wireless networks (including infrared, radio frequency and Bluetooth networks and analog and digital spectrum), and so forth. Additionally, in practical application, the network may be composed of multiple sub-networks, each of which may be of any type previously mentioned.

As shown in FIG. 1, a data file 110 may be provided to a captioner 120. The file may be a real-time or pre-recorded audio and/or video file, containing data corresponding to an event, such as a television program, movie, live performance, courtroom activity, sporting event and so on. Generally, captioning and/or text data (or an input containing captioning and/or text data) may be received either directly from a person or entity creating captions ("captioner") or from a database, server, computing device, or computer-readable medium. The term "captioner" may be used herein to refer to either a person or an entity creating captions. The captioner 120 may receive an audio and/or visual file as the event is taking place or after the event took place, but need not receive the video information associated with the file. In one example, the captioner 120 may transcribe the audio file 110 using a captioning device (not shown). The captioner may generate caption content and/or a data file using a captioning device and substantially in real-time that transcribes the audio portion for the event as it occurs.

The caption content may be, for example, a stream or set of captions to accompany television programming or another event such as a live event, a conference (whether in person or via telephone or other electronic device), a record of a conversation or proceeding (such as might be generated by a court reporter or a stenographer), a record of a written document, and so on. Generally, real-time or non real-time resources such as recorded media, recorded video and/or audio, recorded events, books, documents and so on, may be captioned. The term "event," as used herein, is intended to cover all of these examples as well as any other proceeding, display, or activity that may be captioned or transcribed. Likewise, where the event is recorded by a stenographer, court reporter, voice writer or the like, the notes, record or stream of information is additionally considered to be a "caption" as used herein.

The caption content and/or data file may be transmitted from the captioner 120 to a caption system 130 such as the Bison Interactive Captioning Console ("BICC") or other suitable captioning system. The data file may be transmitted across the network 105 (or another network) or placed on a computer-readable medium accessed by the captioning encoder 130. Captioning system 130 may format the data file into an appropriate format for the receiver. For example, the data file may be formatted into a caption file so that it complies with a closed captioning standard such as EIA-608, generally referred to as line 21 captioning. By formatting the data file, it may be made compatible for receipt and/or processing by various devices such as television receivers, handheld computing devices and so on.

In FIG. 1, the caption system 130 may receive data files including text information, captioning information, metatagging information, time stamps and/or any combination thereof. Thus, data files may be referred to herein as a general file that may be a file including various types of information such as text, captioning information, metatagging information, time stamps and/or any combination thereof. The data files provided by the captioner 120 typically take the form of text of the captioned event and may or may not include captioning information, metadata that allows a user to access additional information regarding the captioned event or any combination thereof. "Captioning information" or "captions" may include text as well as other data that additionally describes the event such as identification of speakers, indication of laughing and/or music, formatting information so that the text may be displayed on video screens (which may not be shown on an end display), carets or other indicators of pauses, changes between speakers, and so on. Generally and as discussed herein, data files including text information (as opposed to captioning information) may allow a user to view the text of the event and may not include captioning information. Additionally, the captioning system may receive captioning and/or text data (or an input containing captioning and/or text data) either directly from the person or entity creating captions or from a database, server, computing device, or computer-readable medium. For example, the captioning and/or text data may be stored as part of a computer readable file and transmitted across a network to the embodiment from a server, captioner or captioning device.

A suitable captioning system may perform a number of functions such as formatting and stripping information from data files for receipt and/or processing by another device. For example, the captioning system may be formatted to comply with a closed captioning standard such as EIA-608 and transmit various types of data files all of which may generally include at least two types of information regarding the captioned event. One type of data file may be a caption file, which may be transmitted from BICC as a live text stream 140. the captioning system may add the caption file to, or multiplex the caption file with, a media stream (such as video intended for broadcast) and transmit the formatted caption file to one or more viewers. In one example, the caption file may appear as text displayed on a screen corresponding to the audio of a program displayed on the screen. Similar to data files, caption files may include text information, metatagging information, time stamps, and formatting.

Continuing this example, the caption file may include text corresponding to the audio of the captioned event. Accordingly, in the event the caption file includes metatag information, the captioning system may strip out the metatag information before transmitting the caption file as the live text stream 140. Formatting and stripping the caption file of metatags will be discussed in further detail below. Certain embodiments may leave the metatag information in the live text stream or may transmit a second live text stream including metatag information. This may be used, for example, when the live text stream is received by a device capable of recognizing and/or processing metatags.

A second type of caption file may be transmitted from the caption system 130 to an archive system 150, which may generate a captioned metatagged file 170. The captioned metatagged file may include text and may also include metatag information, which may be embedded in the caption file by the captioner 120. In this case, the captioning system may format the caption file so that it may be compatible for receipt by the archive system 150. The archive system 150 may store the caption file with the accompanying video file which may be used to further index the file with time stamps, for example, that correspond to the video. This index file. (e.g., the stored caption file, with or without the accompanying video file) may include metatags, caption data, text data, or any combination of the above. Further, any of the foregoing may be omitted. It should be noted that the archive system, as well as the captioned metatagged file and the index file, are optional and may be omitted in certain embodiments. The live text stream 140 may also be archived by the archive system and, in certain embodiments, may be the base file used by the archive system and/or editor system to produce either or both of the edited file 180 and captioned, metatagged file 170.

Additionally, the captioning system may transmit a caption file to an editing system 160. The editing system 160 may be used by an editor to edit the caption file, thereby producing an edited, captioned and metatagged file 180. In one example, the caption file provided to the editing system 160 may be the live text stream file 140. The captioner of the editing system 160 may edit the live text stream file, correct any spelling mistakes, add additional time codes/stamps and add additional metatags. Similar to the captioned and metatagged file 170 produced by the archive system 150, the editing system 160 may provide an edited, captioned and metatagged file 180. The editing system 160 may be omitted from the captioning configuration 100 in certain embodiments.

Captioning and Metatagging the Data File

The caption file may be a real-time transcription of an event, provide text and captioning information that corresponds to the audio of the event and include information such as time stamps. The caption data may be separated into text blocks each containing either a set number of words or all words captioned during a particular time period. For example, the caption data may be segmented into fifty word blocks or into thirty second blocks. Blocks may also include the date and time, down to fractions of seconds, at which each block starts and ends. The various operations discussed herein may access the caption data in increments of one or more blocks.

For example, time stamps may mark the captions in the caption file every three seconds or every thirty-two characters or every word and may cross-reference the captions to the audio of the event. Generally, the first time stamp in the caption file may be manually and/or automatically synchronized to the audio of the event such that the subsequent time stamps of the caption file match the audio of the event. By cross-referencing the text of the caption file to the audio corresponding to the event, it may be possible to access specific portions of the event by accessing the time stamp associated with the text of the caption file.

The captioner 120 may use pre-defined keystrokes or voice commands that correspond to words, phrases, names and so on, when generating the caption file from the audio file 110. Generally, words, phrases, names and so on may be programmed as specific keystrokes (including combinations of keystrokes) on the captioning device. Certain common groups of letters, either words and/or phrases, may be mapped to a single keystroke. This, in turn, may permit the captioner to use fewer keystrokes to spell commonly used, long and/or complex terms and/or names during captioning of the event. For example, a football player's name may have a long and/or complex spelling. By assigning the football player's name to certain keystrokes on the captioning device, the captioner may prevent misspelling the football player's name and may be faster when transcribing the words spoken during the football game. Such shortcut keystrokes may be previously defined by the captioner 120 and stored in a dictionary. The dictionary may be a file associated with the captioning device and may be stored on the captioning device, on a database, server, computing device, or other computer-readable medium and accessed across a network, or as otherwise described herein.

The keystrokes may provide information in addition to the spelling of a word, phrase and/or name in the caption file. The keystrokes may also provide embedded metatag codes in the text code of the caption file that may allow a user to link to additional information pertaining to the captioned event. Automated search capability may also be used to identify information for metatagging and to automatically embed meta tags without employing keystrokes. In one example, the keystroke may provide the spelling of the football player's name, but may also provide an embedded metatag code that allows the user to access additional information regarding the football player such as performance statistics for the game, general information such as height, weight and so on, or may allow the user to jump to specific plays the football player participated in. Additional detail of how the metatags may be constructed and linked to the audio file will be discussed in further detail below.

Although the information associated with the keystrokes (or other entry methods such as a mouse, voice commands, and so on) may vary, the keystrokes may remain the same to the captioner. Stated differently, the captioner may use the same keystrokes for previously programmed words, but the information associated with the keystrokes may be different. From the captioner's perspective, the keystrokes may remain the same for a word or name whether they include metatagging information, spelling information or a combination of both. Thus, a captioner used to particular keystrokes used on a captioning system that does not include metatag functionality may continue to use those same keystrokes with an embodiment described herein. The keystroke may, however, add a metatag as desired (or may not, if none is desired or the use of a metatag is inappropriate with a particular keystroke). The incorporation of metatag code into the text code of the caption file will be discussed in further detail below.

Additionally, in another example, the captioner 120 may generate the caption file from the audio file 110 by employing a voice writer. Generally, the voice writer may use voice recognition to create the caption file instead of and/or in addition to using keystrokes for captioning. In yet another example, the captioner 120 may be a person and may use the voice writer for some of the captioning. Thus, the captioner 120 may be able to use their hands to additionally caption some of the data manually using keystrokes on the captioning machine.

Generally, metatags may be inserted by the captioner 120, caption system 130, editor system 160, and/or archive system 150. For example, the caption system 130 may be a computing device programmed, among other functions to recognize certain terms, words, and/or phrases ("text input") and insert or otherwise link a metatag to the recognized text input. The same is true of the editor system and/or archive system. Thus, certain embodiments may permit the captioner 120 to operate in a manner consistent with prior captioning machines, processes and procedures while the metatags are later inserted.

It should be noted that the metatags may include particular information such as a link to a World Wide Web site, Internet address or other repository of computer-accessible information (collectively, "archive site"). Thus, a user may access the archive site via the metatag in order to obtain more information about the text input or information associated with the text input. Information from the archive site may be displayed on the same device that displays the captions, either in a separate portion of the screen or the same area in which captions are displayed. Caption display may continue or may be halted while the user accesses or reviews information from the archive site.

Figure 2:
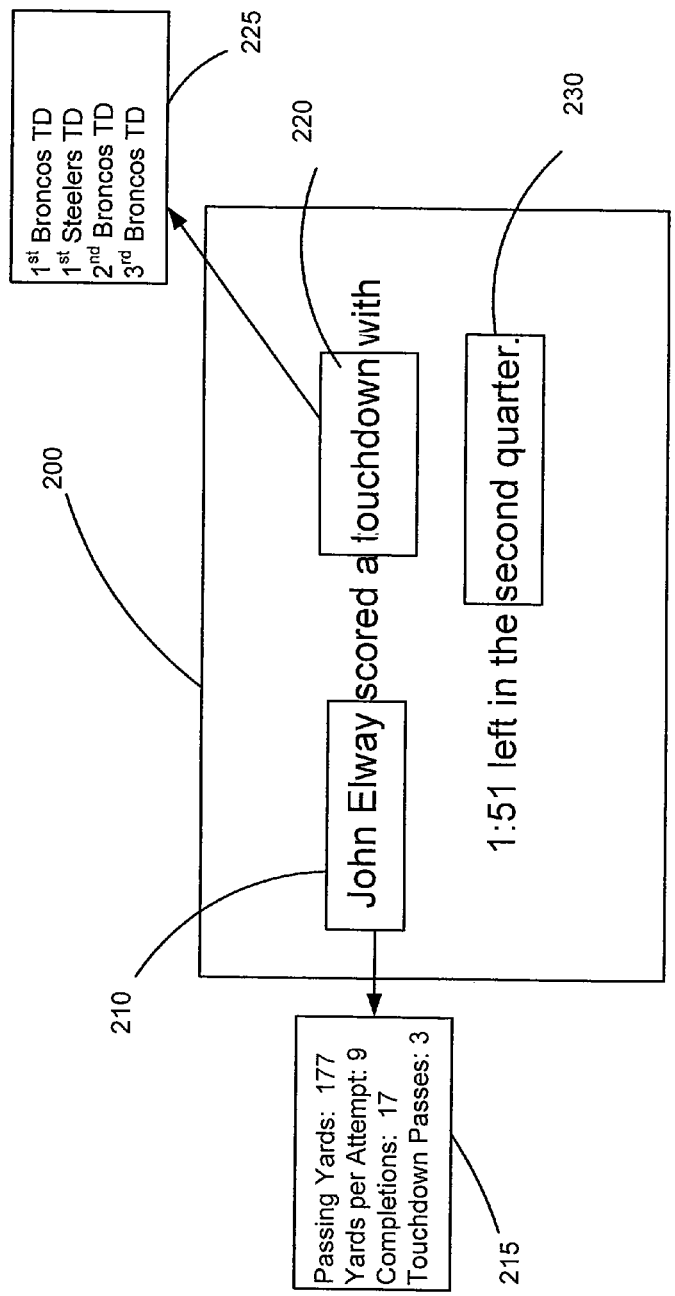
FIG. 2 depicts a sample caption with metatagged words and names.

FIG. 2 depicts a sample caption 200 that includes metatagged words 210, 220, 230. The metatagged words in FIG. 2 are enclosed in boxes for illustrative and explanatory purposes only and may be distinguished from regular text (text without metatags) in a caption as a different color, highlighted, underlined, as a different font and so on. In one example, the caption 200 may be from a captioned football game. The metatagged words 210, 220, 230 may provide different types of information to the user regarding the captioned event. For example, in FIG. 2, the metatagged name in box 210, "John Elway," may provide the user with John Elway's performance statistics for the captioned football game as shown in box 215. The metatagged word (e.g., metatagged text input) in box 220, "touchdown," may provide the user with a list of touchdowns that occurred during the captioned football game as shown in box 225, and the metatagged word 230, "second quarter," may allow the user to review the text and when selected, may direct the user back to the beginning of the text for the second quarter. Such information is generally retrieved from the archive site. Thus, a metatag may provide biographical, geographical, temporal or other information as appropriate based on the underlying word, term or phrase with which the metatag is associated. In certain embodiments, the information to which the metatag points may vary in the context of the overall captioning stream. As an example, a metatag for a sports player's name may lead to a statistical recap of the current game (at least through the time of the caption stream) while a game is being played. The metatag associated with that player's name may retrieve lifetime statistical information, a biography, current news and so forth when the metatag is used outside the context of an ongoing game. Thus, metatags and the information retrieved by the tags may be context-sensitive. Such adjustments may be made either by changing the metatag associated with a keystroke or changing the underlying database (or information in the database) to which the metatag points or from which information is retrieved.

In one example of FIG. 2, a user may be viewing the text 200 of the captioned football game on a handheld device and desire additional information regarding the touchdowns of the game. The user may select the metatagged text of box 220, which, as previously discussed, may be distinguished from the regular (unmetatagged) text in various ways such as different color text. For example, the metatagged text may appear as a link. The user may view selections such as those illustrated in box 255 and upon selection, may be directed to the corresponding text. More specifically, the user may select the option, "$2^{nd}$ Broncos TD," and may be directed to the text corresponding to the Broncos second touchdown of the captioned football game. After the user completes viewing the text of the desired portions of the football game, the user may return to the current, real-time text of the football game.

In an alternative embodiment, a user may be able to search the text of the captioned event as the captioned event takes place. For example, the user may enter the search term "John Elway" into a handheld device while viewing the text of a football game that is currently being played. Caption 200, metatagged text boxes 210, 220, 230 or any combination thereof, may be returned in the search results. Box 210 may be relevant to the search because the user searched the text input "John Elway," while box 220 may be relevant because John Elway may have participated in the touchdown play. Similar to box 220, box 230 also may be relevant as John Elway may have participated in the second quarter. In another example of this embodiment, the user may also search the text for events such as "touchdown in second quarter." In this example, the returned search results may be similar to the previous example. Thus, a user may retrieve captioning data as part of a search. Further, by selecting the captioning data result, the user may retrieve the caption data from the point at which the metatagged term occurs onward either as a streaming output or all at once (for example, as a text file). Alternatively, the user may retrieve the entirety of the caption file either with or without the metatagged term highlighted or otherwise emphasized.

Figure 3:
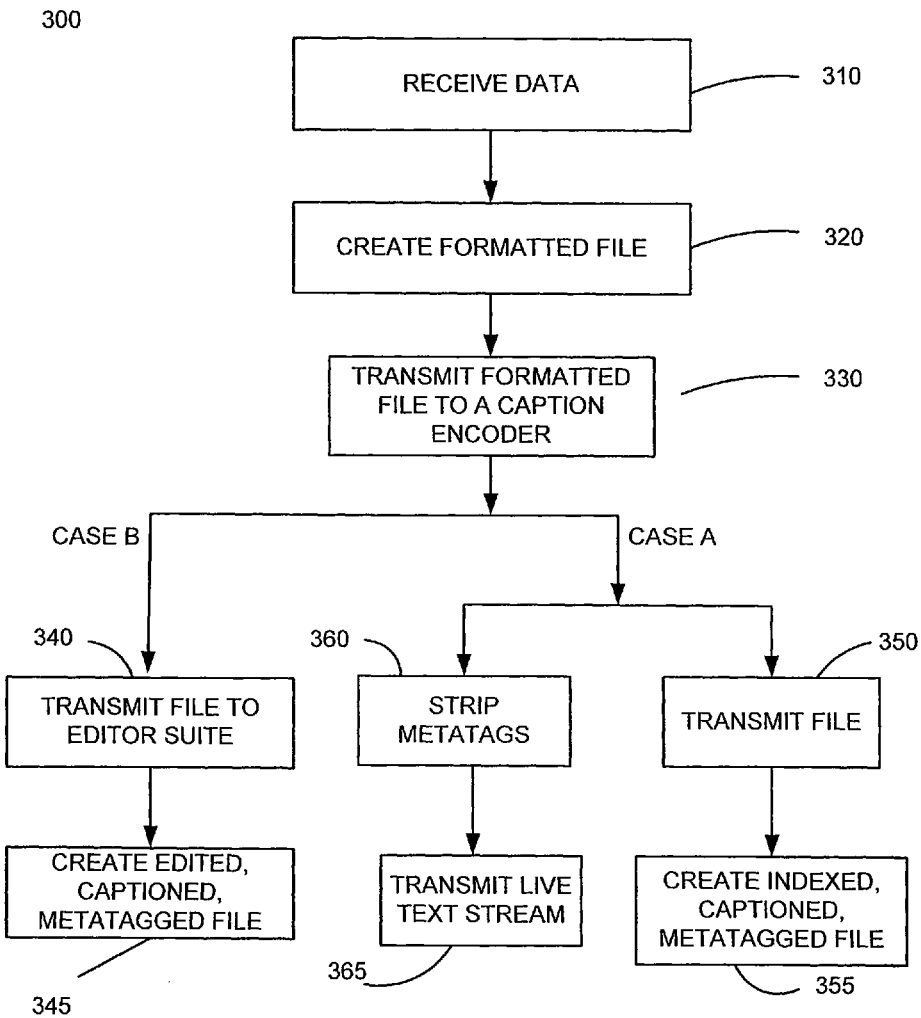
FIG. 3 is a flowchart depicting a sample method for inserting metatags into a caption stream associated with a captioned event.

FIG. 3 is a flowchart generally describing one embodiment of a method for the real-time metatagging. In the operation 310, a captioner may receive data. The data may be an audio or an audiovisual file corresponding to a real-time event and may be received by the captioner in various ways, such as, but not limited to, a streaming data file that is transmitted as the event occurs. The data file may be received by the captioner via a network as previously discussed. For example, the captioner may receive an audio file for a television program that is airing. Additionally, the data may be received by the captioner who may be present at the event. For example, the captioner may be present at a football game and may caption the football announcers commentating over the public announcement system at the football game. In one embodiment, the data file may be a text file that does not include captioning information. In this embodiment, the data file may be later metatagged and/or captioned as discussed in operation 320. Generally, the data file may be a video and/or audio file, a text file that may include captioning information and/or metatagging information or any combination thereof.

In operation 320, a formatted file may be created by the captioner employing a captioning device. Similar to the discussion of FIG. 1, the captioner may transcribe an event using the captioning device. The text may be transmitted as it is generated, to a central server for redistribution and may also be stored as a file. The formatted file may be stored locally to the captioning device and/or the captioner and then transmitted once completed, may be stored remotely on a server as the captioner transcribes the event, or any combination thereof.

The captioning device may allow the captioner to use programmed keystrokes or other entry methods to generate text for commonly used, long and/or complex terms and/or names. Additionally, the keystrokes may include metatagging information associated with the terms and/or names. For example, a specific keystroke may generate the text for a name, but may also embed code for a metatag that corresponds to the name. In order to produce a term and/or name, the keystroke may remain the same on the captioning device whether the metatagging information is included in the text or not. However, the code that corresponds to the term and/or name as defined on the captioning device may change. Continuing the above example, the name as it appears in the caption may be marked in the caption, so that a user may know that by selecting the name, additional information may be accessed. Although the metatagging information may be included in the formatted file in operation 320, metatagging the formatted file may be performed in various ways as discussed below.

In another embodiment, the captioner may use the captioning device to metatag the formatted file instead of captioning the file. In this embodiment, upon receipt by the captioner in operation 310, the original data file may be a text file with no captioning information. As previously discussed, the captioner may use programmed keystrokes on the captioning device to metatag the data file. However, in this embodiment, the programmed keystrokes may include metatagging information and no captioning information. Continuing this embodiment, the captioner may generate a stream with metatag information embedded in the text information.

In another example of this embodiment, multiple streams may be produced by the captioner. In this example, the captioning device may produce multiple streams, in which each stream may have different embedded information. For example, a first stream may be generated that includes text and metatagging information, a second stream may be generated that includes text and captioning information and a third stream may be generated that has text, metatagging and captioning information.

In operation 330, the formatted file may be transmitted to a caption system which may further format the formatted file so that it may be compatible for end users including, but not limited to, cable, satellite and broadcast programming providers, Internet providers and so on. The caption encoder may also insert or otherwise format metatags, generally as discussed herein. In Case A, the formatted file may include metatags and may proceed to either of operations 350 and/or 360, or both. In Case B, the formatted file may not include metatags and will be discussed in detail below. Generally, but not necessarily, these cases are exclusive.

Returning to Case A of FIG. 3, in operation 360, the caption system may strip or remove the metatags from the formatted file and in operation 365, the stripped file may be transmitted as a live text stream to an end user. The stripped file may or may not include captioning information. Continuing the discussion of Case A, in operation 350 (which may be performed concurrently with operation 360), the formatted file may be transmitted to an archive system. In operation 355, the formatted file may be time-coded and metatagged and indexed to a video file. Although the formatted file may already include time-codes, additional time-codes may be included in the formatted file so that the formatted file may be indexed to the video file. Likewise, the formatted file may have existing metatags that were embedded by the captioner in operation 320, but additional metatags may be incorporated into the formatted file. Operations 360 and 365 may occur simultaneously with, before or after operations 350 and 355, or may be interleaved therewith.

Turning to Case B of FIG. 3, the formatted file may not include metatags. That is, in operation 320, when creating the formatted file, the captioner may not have embedded metatags in the formatted file. In operation 340, the formatted file may be transmitted from the caption system to an editing system. The editing system may receive the formatted file and may also receive the data file of operation 310 and may include another captioner. In operation 345, the editing system may edit the existing formatted file by comparing the formatted file to the original data file of operation 310. Additionally, in operation 345, the editing system may add further time-codes to the formatted file. Similar to previously discussed operation 365, the formatted file may be time-coded, but the editing system may insert additional time codes. For example, before the additional time codes are inserted in operation 365, the formatted file may include time stamps every three seconds or thirty-two characters. In operation 345, time stamps may be inserted for each line of captioning. Further, the operation 345 may create a series of time blocks, each of a fixed length, and containing or associated with captions occurring within each such time block.

As an example of such time-coding, presume a captioned event such as a television program is thirty minutes long and each time block is fifteen seconds long. The television program may include 120 separate time blocks and each time block may be associated with all captions occurring during the time block. Thus, the first time block may include or be associated with all captions occurring in the first fifteen seconds of the show. Likewise, the fiftieth time block may include or be associated with all captions occurring between twelve minutes and thirty seconds and twelve minutes and forty-five seconds from the beginning of the television program. In alternative embodiments, the blocks may be of variable length. As one non-limiting example, each block may contain a specific number of words, sentences, captions and so forth.

In operation 345, the formatted file may also be metatagged. The editing system may metatag the formatted file by identifying relevant words and inserting the metatag codes so that when the word is selected by a user, the correct data and/or action is associated with the word. The data may specify data pertaining to the word and the action may direct the user to the desired portion of text.

Additionally, it should be noted that one or more of operations 310 to 365 of FIG. 3 may be omitted in alternative embodiments of the invention. For example, an alternative embodiment may not include an editing system, thus removing operations 340 and 345. Similarly, the order in which the operations displayed in FIG. 3 are executed may be varied in alternative embodiments.

CONCLUSION

Although the present invention has been described with respect to various embodiments, systems and processes herein, it will be appreciated by one of ordinary skill in the art that the embodiments, systems and/or processes may be changed without departing from the spirit or scope of the invention. For example, the archive system 150 may be multiple modules, each of which performs a separate function. Continuing the example, one module of the archive system may add time codes, while a second module may add metatags and a third module may index the video file and the caption file to one another. Accordingly, the proper scope of the invention is defined by the appended claims. The various embodiments, operations, components and configurations disclosed herein are generally exemplary rather than limiting in scope.

What is claimed is:

1. A method for metatagging a caption stream associated with an event, comprising:
receiving, at a first device, at least a first set of audio data corresponding to the event;

generating a data file including both text and at least one metatag code from the first set of audio data, wherein the data file is not a caption file and does not include captioning data utilizable by a captioning system to display captions; wherein the at least one metatag code is context sensitive metatag code in relation to a given portion of the text and identifies a storage location of the context sensitive additional information related to the given portion of the text;

receiving the generated data file; and formatting the received data file to generate a caption file, wherein a user may select at least a portion of caption information generated utilizing the caption file, the portion of the caption information associated with the at least one metatag code, to directly access the context sensitive additional information related to the event.

2. The method of claim 1, further comprising using an automated search to identify information for metatagging.

3. The method of claim 1, further comprising using a voice writer to produce the at least one metatag code.

4. The method of claim 1, further comprising using keystrokes on the first device to produce the at least one metatag code.

5. The method of claim 1, further comprising generating a stripped caption file by stripping the at least one metatag code from the caption file using the second device which is a captioning system.

6. The method of claim 5, further comprising transmitting the stripped caption file as a live text stream.

7. The method of claim 1, further comprising:
transmitting the caption file to an archive system; and
transmitting at least video data to the archive system.

8. The method of claim 7 further comprising time stamping the caption file to cross reference the caption file to the video data.

9. The method of claim 7 further comprising embedding at least one additional metatag code[s] into the caption file.

10. The method of claim 1 further comprising receiving the caption file at an editing system.

11. The method of claim 10 further comprising editing the caption file for accuracy using the first set of audio data.

12. The method of claim 11 further comprising embedding at least one additional metatag code[s] into the caption file.

13. The method of claim 12 further comprising time stamping the caption file to cross reference the caption file to the first set of audio data.

14. The method of claim 1 further comprising:
receiving a second set of audio data at the first device;
generating an additional text file including both text and the at least one metatag code[s] for the second set of audio data for the event by employing the first device to produce both text and the at least one metatag code[s];
receiving the additional text file at a second device; and
formatting the additional text file with the second device to generate a second caption file.

15. A method for metatagging an event, comprising:
receiving audio data associated with an event at a captioning device;
employing the captioning device to produce a caption file;
formatting the caption file using a caption system;
editing the formatted caption file using the audio data;
transmitting the formatted caption file and the audio data to an editing system; and
embedding at least one metatag code into the formatted caption file employing the editing system, wherein the at least one metatag code is context sensitive metatag code in relation to a given portion of the caption file and identifies a storage location of the context sensitive additional information related to the event and to the given portion of the caption file;

wherein a user may select at least a portion of caption information generated utilizing the formatted caption file, the portion of the caption information associated with the at least one metatag code, to directly access the context sensitive additional information.

16. The method of claim 15, further comprising using an automated search to identify information for metatagging.

17. The method of metatagging an event of claim 15, further comprising using a voice writer to produce at least one of text or the at least one metatag code[s].

18. The method of metatagging an event of claim 15, further comprising using keystrokes on the first device to produce at least one of text or the at least one metatag code[s].

19. The method of claim 15 further comprising time stamping the formatted caption file.

20. A method for creating a metatagged file comprising:
receiving a text file at a captioning device, wherein the text file is not a caption file and does not include captioning data utilizable by a captioning system to display captions;
generating a caption file at the captioning device by employing the captioning device to embed at least one metatag code in the caption file; wherein the at least one metatag code is context sensitive metatag code in relation to a given portion of the text file and identifies a storage location of the context sensitive additional information related to the given portion of the text file;
editing the formatted caption file using the audio data; and
transmitting the caption file as a live text stream with the at least one embedded metatag code to create a metatag file, wherein a user may select at least a portion of caption information generated utilizing the caption file, the portion of the caption information associated with the at least one embedded metatag, to directly access the context sensitive additional information related to an event corresponding to the text file.

21. The method for creating a metatagged file of claim 20, further comprising using an automated search to identify information for metatagging.

22. The method of creating a metatagged file of claim 20, further comprising using a voice writer to produce at least one of text or the at least one metatag code[s].

23. The method of creating a metatagged file of claim 20, further comprising using keystrokes on the captioning device to produce at least one of text or the at least one metatag code[s].

24. The method for creating a metatagged file of claim 20 further comprising:
transmitting the metatagged file to an archive system;
transmitting video data to the archive system;
indexing the metatagged file to the video data.

25. The method for creating a metatagged file of claim 24 wherein indexing the caption file to the video data further comprises time stamping the caption file.

26. A system for creating a metatagged caption file comprising:
a caption device to receive at least a first set of audio data of an event while the event is occurring at the caption device;
a first device, further to produce text and at least one metatag code using the same keystroke and further to generate a text file, wherein the text file is not a caption file and does not include captioning data utilizable by a captioning system to display captions;

wherein the at least one of the metatag code is context sensitive metatag code in relation to a given portion of a text and identifies a storage location of context sensitive additional information related to the given portion of the text; and a captioning system to receive the text file and to generate a caption file by formatting the received text file wherein a user may select at least a portion of caption information generated utilizing the caption file, the portion of the caption information associated with the at least one metatag code, to directly access the context sensitive additional information related to the event.

27. The system for creating a metatagged caption file of claim 26 further comprising an editing system to:
edit the caption file;
strip the at least one metatag code from the caption file; add at least one second metatag code to the caption file; and
index the caption file to at least one of video data or audio data.

28. The system for creating a metatagged caption file of claim 26 further comprising an archive system to:
receive the caption file;
receive at least one of video data or audio data; and
index the caption file to at least one of the video data or audio data.

* * * * *